(12) United States Patent
Luo

(10) Patent No.: US 12,130,543 B1
(45) Date of Patent: Oct. 29, 2024

(54) TABLETOP PANORAMA PHOTOGRAPHIC PLATFORM

(71) Applicant: Shenzhen Luoyan Technology Co., Ltd., Shenzhen (CN)

(72) Inventor: Yan Luo, Shenzhen (CN)

(73) Assignee: Shenzhen Luoyan Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/663,069

(22) Filed: May 14, 2024

(51) Int. Cl.
 *G03B 17/56* (2021.01)
 *F16M 11/12* (2006.01)
 *G03B 37/02* (2021.01)

(52) U.S. Cl.
 CPC ......... *G03B 17/561* (2013.01); *F16M 11/126* (2013.01); *G03B 37/02* (2013.01)

(58) Field of Classification Search
 CPC .... G03B 17/561; G03B 37/02; G03B 17/563; G03B 37/00; G03B 15/006; F16M 11/126; H04N 23/698
 See application file for complete search history.

(56) References Cited

U.S. PATENT DOCUMENTS

| | | | |
|---|---|---|---|
| 11,500,271 B2 | 11/2022 | Liu et al. | |
| 2017/0146892 A1* | 5/2017 | Wei | G03B 17/563 |
| 2021/0173287 A1* | 6/2021 | Qian | F16M 13/00 |
| 2021/0258462 A1* | 8/2021 | Goldburt | G03B 17/561 |
| 2023/0349507 A1* | 11/2023 | Liu | F16H 19/04 |
| 2024/0241430 A1* | 7/2024 | Chen | G03B 17/565 |

* cited by examiner

*Primary Examiner* — Albert H Cutler

(57) ABSTRACT

The present disclosure relates to the technical field of photographic and photographing, and provides a tabletop panorama photographic platform comprising an L-shaped holder, an equipment clamp, a pan-tilt, a first fixing member, a butting screw, a second fixing member, a plastic gasket, a hand-grabbing rod, a roller, a telescopic rod, a connecting member, a flange bearing, a U-shaped clamping slot, a supporting table, a table fixing screw, a third fixing member, a knurled nut, a rotating bearing, a fourth fixing member, a supporting rod and a base. The equipment clamp is movably connected to a back end of the L-shaped holder, the pan-tilt is movably connected to a lower end of the L-shaped holder. According to the tabletop panorama photographic platform, the ends of the two hand-grabbing rods are grabbed by each of the user's hands, and together with the roller at bottom, the fourth fixing member, and the bearings, the horizontal arbitrary angle adjustment of a photographic device around the table. Such designing provides great flexibility and allows the photographer to easily adjust the photographic angle to capture the best viewing angle.

7 Claims, 7 Drawing Sheets

TABLETOP PANORAMA PHOTOGRAPHIC PLATFORM

FIELD

The present disclosure relates to the technical field of photographic and photographing, and in particular, to a tabletop panorama photographic platform.

BACKGROUND

With the rise of social media and content creation, photographers and videographers are looking for more flexible photographic solutions that can adapt to various environments, especially in limited space or when quick setup and adjustment are required. Responding to the inconvenience and operational complexity of traditional large-scale photographic equipment, such devices meet the requirements of efficiency, flexibility and versatility in modern photography through innovative designs that integrate adjustable rotation mechanisms, telescopic performance, and multi-device compatibility.

A panorama photographic device is disclosed in a document of prior art with publication number CN201754214U, which belongs to the field of information science and technology. Wherein, the panorama photographic device comprises a plurality of cameras uniformly arranged on a 360° annular holder, with the lenses of the plurality of cameras being oriented to the outside of the holder, and further comprises a synchronization controller which is connected with the plurality of cameras and is used for controlling the plurality of cameras to carry out synchronous photographic of images; and a data transmission module which is connected with the plurality of cameras and is used for transmitting the image taken by the plurality of cameras to a computer, so that the computer can splice the received images to obtain a panoramic image. The panorama photographic device according this document can realize the panoramic image of dynamic and continuous photographic scene. The panorama photographic device according this document is suitable for image-based navigation data production, urban and traffic facilities survey and mapping.

However, in the prior art of CN201754214U, due to the poor photographic ability of the panorama photographic device, in the actual use, the photographic angle cannot be easily adjusted to capture the best viewing angle.

SUMMARY

An object of the present disclosure is to provide a tabletop panorama photographic platform to solve the problem of poor photographic ability of the panorama photographic device proposed in the backgrounds above.

In order to achieve the above purpose, the present disclosure provides the following technical solutions: A tabletop panorama photographic platform comprising an L-shaped holder, an equipment clamp, a pan-tilt, a first fixing member, a butting screw, a second fixing member, a plastic gasket, a hand-grabbing rod, a roller, a telescopic rod, a connecting member, a flange bearing, a U-shaped clamping slot, a supporting table, a table fixing screw, a third fixing member, a knurled nut, a rotating bearing, a fourth fixing member, a supporting rod, a base and a vacuum suction cup, wherein the equipment clamp is movably connected to a back end of the L-shaped holder, the pan-tilt is movably connected to a lower end of the L-shaped holder, the first fixing member is fixedly connected to a lower end of the pan-tilt, the butting screw is fixedly connected to a lower end of the first fixing member, the second fixing member is fixedly connected to a lower end of the butting screw, the plastic gasket is fixedly connected to a lower end of the second fixing member, and the pan-tilt is movably connected to is to the first fixing member by the screws, providing flexible camera mounting options.

Preferably, the hand-grabbing rod is movably connected to the left and a right ends of the first fixing member, and a roller is movably connected to a lower end of the hand-grabbing rod.

Preferably, the telescopic rod is movably connected to the back end of the first fixing member, and the connecting member is fixedly connected to the rear end of the telescopic rod.

Preferably, a U-shaped clamping slot is fixedly connected to a rear side of the telescopic rod, a flange bearing is fixedly connected to a front end of the U-shaped clamping slot, and the connecting member is fixed with penetrating through the U-shaped clamping slot and the flange bearing.

Preferably, the knurled nut is movably connected to a upper side of the rotating bearing, and the third fixing member is fixedly connected to a upper end of the knurled nut.

Preferably, the supporting table is fixedly connected to a upper end of the third fixing member by a table fixing screw.

Preferably, the supporting rod is fixedly mounted by penetrating into the fourth fixing member and a built-in bearing of the fourth fixing member, and the base is fixedly connected to a lower end of the supporting rod. A flange bearing is built at one end of the clamping slot, which is sleeved on one end of the connecting member and fixed by a nut, and the other end of the connecting member is fixed with the telescopic rod.

Preferably, the supporting rod is fixedly connected to a lower end of the fourth fixing member, the base is fixedly connected to a lower end of the supporting rod. The base, which is the basis of the platform, can be flexibly fixed according to the tabletop material. For a wooden tabletop table, it can be fixed using self-tapping screws with four holes in the base. And for the special tabletop such as glass, stone or leather, a matching vacuum suction cup can be used by combining the vacuum suction cup by means of a ¼" threaded hole at the lower end of the supporting rod 20 and a ¼" screw to achieve fixation, so as to ensure the stability of the platform.

Compared with the prior art, the beneficial effects of the present application are:

1. According to the tabletop panorama photographic platform, the ends of the two hand-grabbing rods are grabbed by each of the user's hands, and together with the roller at bottom, the fourth fixing member, and the bearings, the horizontal arbitrary angle adjustment of a photographic device around the table. Such designing provides great flexibility and allows the photographer to easily adjust the photographic angle to capture the best viewing angle.

2. According to the tabletop panorama photographic platform, the hand-grabbing rod is mounted on the second fixing member through the butting screw, and the position-limiting function of its design allows the hand-grabbing rod to be freely adjusted between 0° and 130°, which is not only convenient for the user to adjust the operation angle according to needs, but also convenient for the storage and carrying of the platform.

3. According to the portable tabletop intelligent panorama photographic table device, the pan-tilt and L-shaped holder equipped with increase the compatibility with different photographic devices, thereby providing more photographic options and flexibility, and meeting the diverse photographic needs. The replacement of the base and the vacuum suction cup makes it suitable for most tabletops with different materials, in which the base can be fixed on the tabletop for long-term use, and the vacuum suction cup is easy to quickly disassemble and move.

Figure 1:
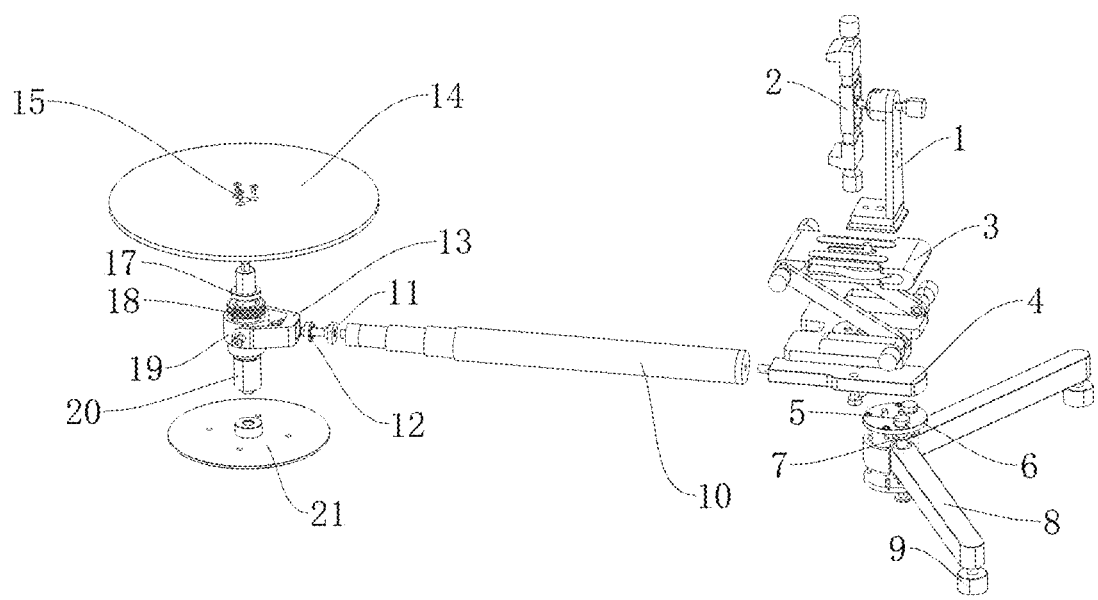
FIG. 1 is a schematic diagram of the three-dimensional structure of the platform according to the present disclosure.

In the drawings:
1. L-shaped holder; 2. equipment clamp; 3. pan-tilt; 4. first fixing member; 5. butting screw; 6. second fixing member; 7. plastic gasket; 8. hand-grabbing rod; 9. roller; 10. telescopic rod; 11. connecting member; 12. flange bearing; 13. Supporting table; 14. U-shaped clamping slot; 15. table fixing screw; 16. third fixing member; 17. knurled nut; 18. rotating bearing; 19. fourth fixing member; 20. supporting rod; 21. Base; ans 22. vacuum suction sup.

DETAILED DESCRIPTION

In the following, the technical solutions in the embodiments of the present disclosure will be clearly and completely described in conjunction with the accompanying drawings in embodiments of the present disclosure. Obviously, the described embodiments are only a part of the embodiments of the present application rather than all embodiments. Based on the embodiments in the present disclosure, all other embodiments obtained by those of ordinary skill in the art without making creative labor, fall within the scope of the protection of the present disclosure.

Embodiment 1

Figure 2:
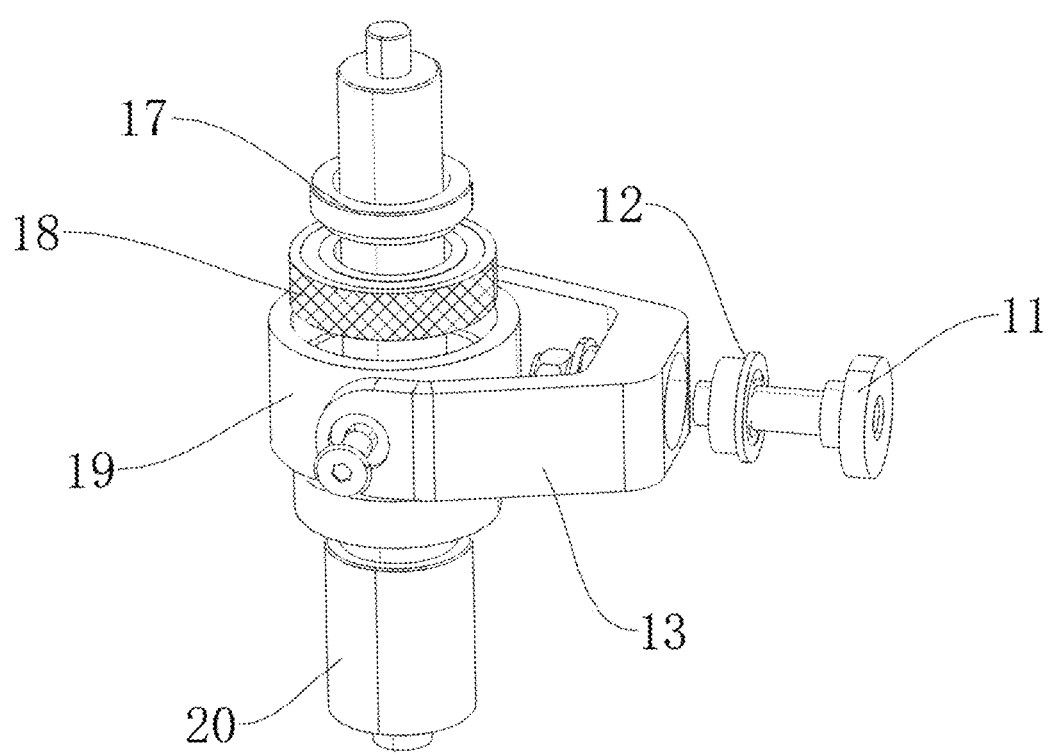
FIG. 2 is a schematic diagram of the structure of a table fixing module of the platform according to the present disclosure.
Figure 3:
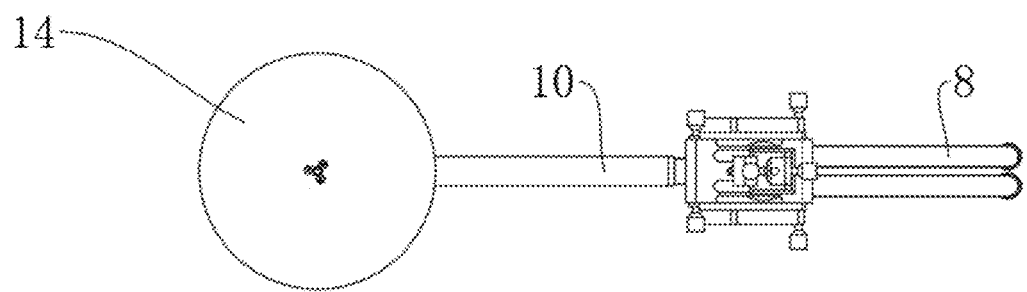
FIG. 3 is a schematic diagram of the action of the hand-grabbing rod of the platform according to the present disclosure.
Figure 3:
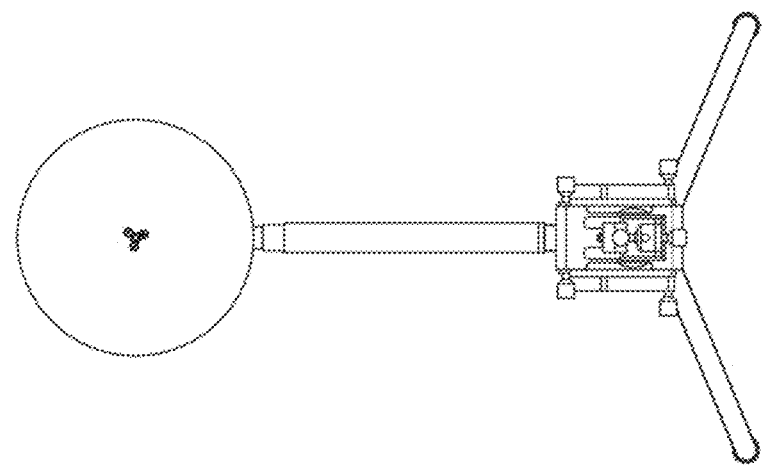
Figure 4:
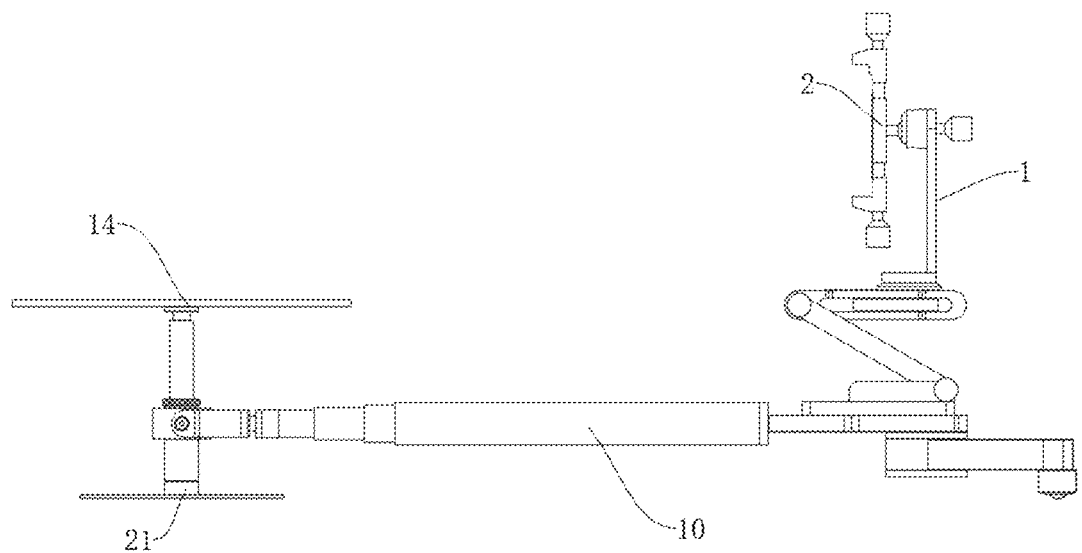
FIG. 4 is a front view of the main body structure of the platform according to the present disclosure.
Figure 5:
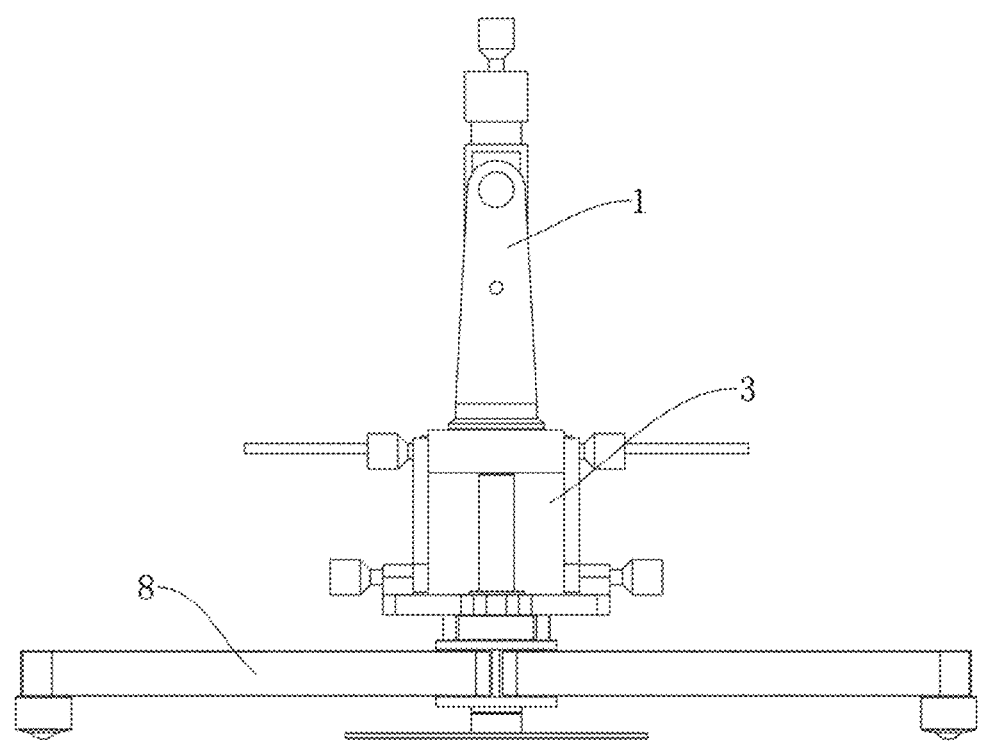
FIG. 5 is a left view of the main body structure of the platform according to the present disclosure.
Figure 6:
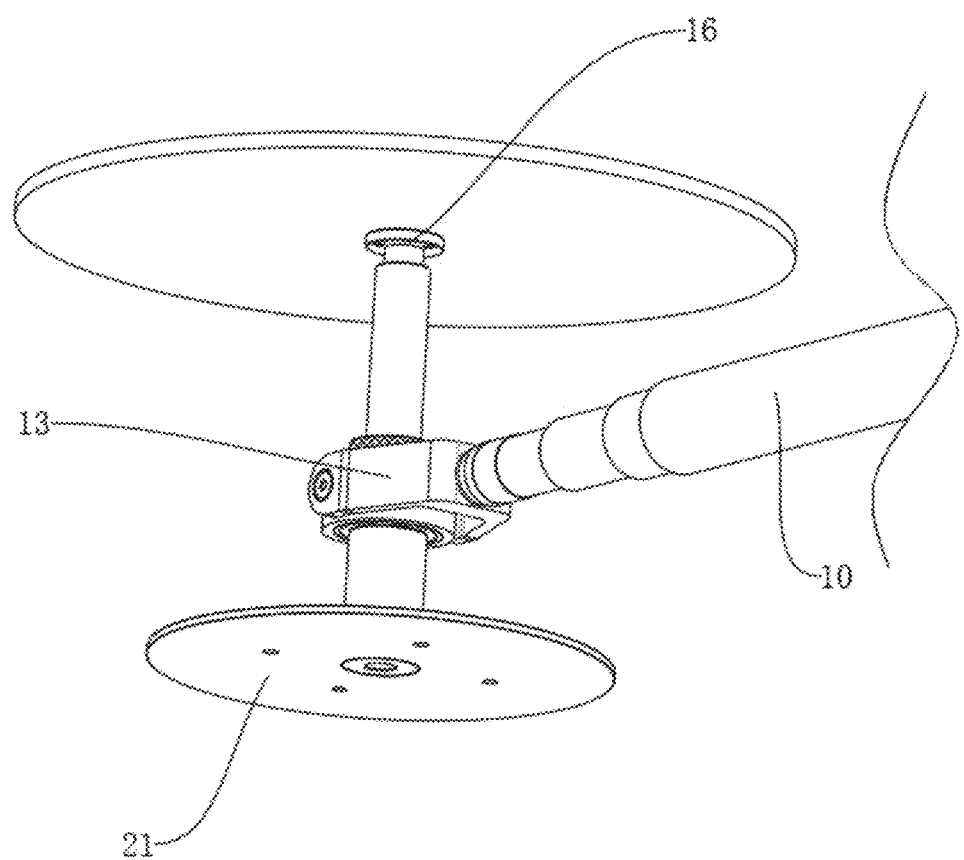
FIG. 6 is an upward view of the table bottom of the platform according to the present disclosure.

Referring to FIGS. 1-6, the present disclosure provides the following technical solutions: A tabletop panorama photographic platform comprising an L-shaped holder 1, an equipment clamp 2, a pan-tilt 3, a first fixing member 4, a butting screw 5, a second fixing member 6, a plastic gasket 7, a hand-grabbing rod 8, a roller 9, a telescopic rod 10, a connecting member 11, a flange bearing 12, a U-shaped clamping slot 13, a supporting table 14, a table fixing screw 15, a third fixing member 16, a knurled nut 17, a rotating bearing 18, a fourth fixing member 19, a supporting rod 20, and a base 21, wherein the equipment clamp 2 is movably connected to a back end of the L-shaped holder 1, the pan-tilt 3 is movably connected to a lower end of the L-shaped holder 1, the first fixing member 4 is fixedly connected to a lower end of the pan-tilt 3, the butting screw 5 is fixedly connected to a lower end of the first fixing member 4, the second fixing member 6 is fixedly connected to a lower end of the butting screw 5, the plastic gasket 7 is fixedly connected to a lower end of the second fixing member 6, the hand-grabbing rods 8 are movably connected to left and right ends of the first fixing member 4, the roller 9 is movably connected to a lower end of the hand-grabbing rod 8, the hand-grabbing rod portion is mounted at the lower end of the first fixing member 4 by means of the second fixing member 6, one roller 9 is respectively mounted on each hand-grabbing rod 8, so that the mobility of the platform is improved; the plastic gasket 7 and the butting screw 5 between the hand-grabbing rod 8 and the second fixing member 6 ensure the stability and adjustment flexibility of the hand-grabbing rod. The design of this panorama photographic platform has taken into account portability, stability and multi-functionality, and can be applied to various photographic environments and needs. The pan-tilt 3 can include two or more pan-tilt arms, each of the pan-tilt arm connected end by end. Besides, one free end of the pan-tilt 3 is connected with the L-shaped holder 1, to change the position of the L-shaped holder 1 during using. In one embodiment, the pan-tilt 3 can be divided into two sections of a long section and a short section, the two sections are fixed by one or more butting screws.

One end of the telescopic rod 10 is movably connected to the first fixing member 4; the connecting member 11 is fixedly connected to the other end of telescopic rod 10; the U-shaped clamping slot 13 is fixedly connected to the back side of telescopic rod 10; the flange bearing 12 is fixedly connected to the front end of the U-shaped clamping slot 13; the connecting member 11 is fixed with penetrating through the U-shaped clamping slot 13 and flange bearing 12; the fourth fixing member 19 is fixedly connected inside the U-shaped clamping slot 13; the rotating bearing 18 is movably connected to the upper and lower ends of the fourth fixing member 19; and the third fixing member 16 is not only fixed with the supporting tabletop 13, but also reserved with international standard ¼" thread, thereby facilitating the function expansion; the core of the rotating portion is the U-shaped clamping slot 14 whose two sides are fixed at the outer side of the fourth fixing member 19 by screws; the flange bearing 12 is built in one end of the clamping slot, and is sleeved with one end of the connecting member 11 and fixed by a nut; the other end of the connecting member 11 is fixed with the telescopic rod 10, and the other end of the telescopic rod 10 is fixed with the first fixing member 4; and the pan-tilt 3 is fixed with the first fixing member 4 through a screw, thereby flexible camera mounting options are provided.

The knurled hat 17 is movably connected to the upper side of the rotating bearing 18; the third fixing member 16 is fixedly connected to the upper end of the knurled hat 17; the supporting tabletop 14 is fixedly connected to the upper end of the third fixing member 16 through the tabletop fixing screw 15; the supporting rod 20 is fixedly mounted by penetrating into the fourth fixing member 19 and its built-in bearing; the vacuum suction cup 22 is connected to the supporting rod 20; and the upper and lower ends of the fourth fixing member 19 are fixed to the supporting rod 20 through the knurling hat 17 and the bearing 18, thereby ensuring that it is stable and does not move when in use.

Working principle: the base 21 is the basis of the device, can be flexibly fixed according to the material of the tabletop. The base 21 can also be a suction cup or be configured with suction cups at the bottom of the base 21.

When the base 21 is put on the ground or tabletop, the base 21 can be attached to the ground or tabletop. For the wooden tabletop, it can be fixed by using self-tapping screws and the four holes of the base; the support rod 20 is fixed with the base 21 through threads, and the upper end is connected with the acrylic support tabletop 13 through the third fixing member 16; the upper and lower ends of the fourth fixing member 19 are fixed to the support rod 20 through the knurled nut 17 and bearing 18, thereby ensuring that it is stable and does not move when in use; the third fixing member 16 is not only fixed with the support tabletop 13, but also reserved with international standard ¼" thread, thereby facilitating the function expansion; the core of the rotating portion is the U-shaped clamping slot 14 whose two sides are fixed at the outer side of the fourth fixing member 19 by screws; the flange bearing 12 is built in one end of the clamping slot, and is sleeved with one end of the connecting member 11 and fixed by a nut; the other end of the connecting member 11 is fixed with the telescopic rod 10, and the other end of the telescopic rod 10 is fixed with the first fixing member 4; and the pan-tilt 3 is fixed with the first fixing member 4 through a screw, thereby flexible camera mounting options are provided. It can be used directly with a camera or by being equipped with the L-shaped holder 1 to match mobile phone photographic, increasing the interchangeability and versatility of the platform. The hand-grabbing rod portion is mounted at the lower end of the first fixing member 4 by means of the second fixing member 6, and one roller 9 is respectively mounted on each hand-grabbing rod 8, so that the mobility of the platform is improved; the plastic gasket 7 and the butting screw 5 between the hand-grabbing rod 8 and the second fixing member 6 ensure the stability and adjustment flexibility of the hand-grabbing rod. The design of this panorama photographic platform has taken into account portability, stability and multi-functionality, and can be applied to various photographic environments and needs, thereby providing a highly adjustable and flexible photographic platform for photographers.

Embodiment 2

Figure 7:
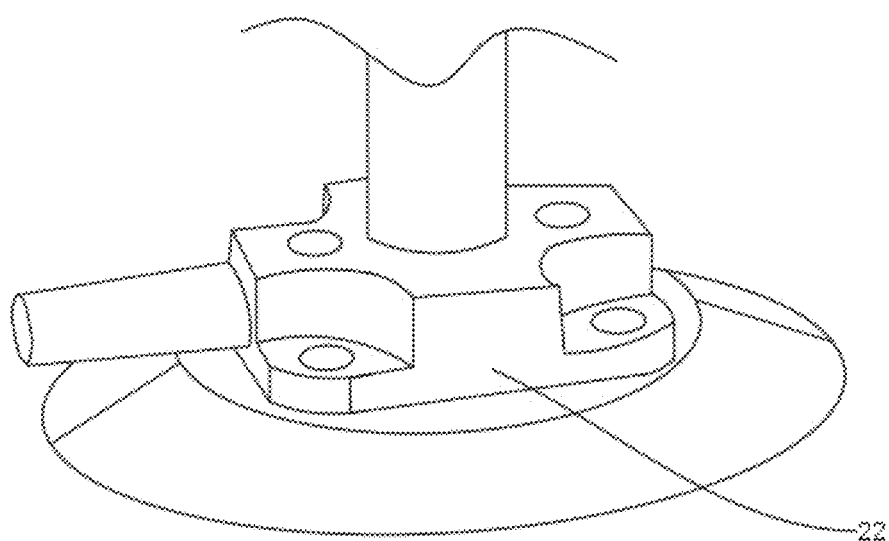
FIG. 7 is a schematic diagram of the structure of the suction cup of the platform according to the present disclosure.

Referring to FIGS. 1-7, the present disclosure provides the following technical solutions: A tabletop panorama photographic platform comprising an L-shaped holder 1, an equipment clamp 2, a pan-tilt 3, a first 8 fixing member 4, a butting screw 5, a second fixing member 6, a plastic gasket 7, a hand-grabbing rod 8, a roller 9, a telescopic rod 10, a connecting member 11, a flange bearing 12, a U-shaped clamping slot 13, a supporting table 14, a table fixing screw 15, a third fixing member 16, a knurled nut 17, a rotating bearing 18, a fourth fixing member 19, a supporting rod 20, a base 21, and a vacuum suction cup 22, wherein the equipment clamp 2 is movably connected to a back end of the L-shaped holder 1, the pan-tilt 3 is movably connected to a lower end of the L-shaped holder 1, the first fixing member 4 is fixedly connected to a lower end of the pan-tilt 3, the butting screw 5 is fixedly connected to a lower end of the first fixing member 4, the second fixing member 6 is fixedly connected to a lower end of the butting screw 5, the plastic gasket 7 is fixedly connected to a lower end of the second fixing member 6, the hand-grabbing rods 8 are movably connected to left and right ends of the first fixing member 4, the roller 9 is movably connected to a lower end of the hand-grabbing rod 8, the hand-grabbing rod portion is mounted at the lower end of the first fixing member 4 by means of the second fixing member 6, one roller 9 is respectively mounted on each hand-grabbing rod 8, so that the mobility of the platform is improved; the plastic gasket 7 and the butting screw 5 between the hand-grabbing rod 8 and the second fixing member 6 ensure the stability and adjustment flexibility of the hand-grabbing rod. The design of this panorama photographic platform has taken into account portability, stability and multi-functionality, and can be applied to various photographic environments and needs.

One end of the telescopic rod 10 is movably connected to the first fixing member 4; the connecting member 11 is fixedly connected to the other end of telescopic rod 10; the U-shaped clamping slot 13 is fixedly connected to the back side of telescopic rod 10; the flange bearing 12 is fixedly connected to the front end of the U-shaped clamping slot 13; the connecting member 11 is fixed with penetrating through the U-shaped clamping slot 13 and flange bearing 12; the fourth fixing member 19 is fixedly connected inside the U-shaped clamping slot 13; the rotating bearing 18 is movably connected to the upper and lower ends of the fourth fixing member 19; and the third fixing member 16 is not only fixed with the supporting tabletop 13, but also reserved with international standard ¼" thread, thereby facilitating the function expansion; the core of the rotating portion is the U-shaped clamping slot 14 whose two sides are fixed at the outer side of the fourth fixing member 19 by screws; the flange bearing 12 is built in one end of the clamping slot, and is sleeved with one end of the connecting member 11 and fixed by a nut; the other end of the connecting member 11 is fixed with the telescopic rod 10, and the other end of the telescopic rod 10 is fixed with the first fixing member 4; and the pan-tilt 3 is fixed with the first fixing member 4 through a screw, thereby flexible camera mounting options are provided.

The knurled hat 17 is movably connected to the upper side of the rotating bearing 18; the third fixing member 16 is fixedly connected to the upper end of the knurled hat 17; the supporting tabletop 14 is fixedly connected to the upper end of the third fixing member 16 through the tabletop fixing screw 15; the supporting rod 20 is fixedly mounted by penetrating into the fourth fixing member 19 and its built-in bearing; the vacuum suction cup 22 is connected to the supporting rod 20; and the upper and lower ends of the fourth fixing member 19 are fixed to the supporting rod 20 through the knurling hat 17 and the bearing 18, thereby ensuring that it is stable and does not move when in use.

Compared with the Embodiment 1, the base 21 is replaced with the vacuum suction cup 22 in the Embodiment 2. The use of the vacuum suction cup 22 can be applied to special tabletop of special materials such as glass, stone, leather, etc., in which the base can be fixed on the tabletop for a long time, and the vacuum suction cup is also convenient for quick disassembly and movement.

Working principle: for the tabletop of special materials such as glass, stone or leather, the matching vacuum suction cup 22 combined with the supporting rod 20 can be used to achieve fixation, thereby ensuring the stability of the platform; the upper end of the supporting rod 20 is connected with the acrylic support tabletop 13 through the third fixing member 16; the upper and lower ends of the fourth fixing member 19 are fixed to the support rod 20 through the knurled nut 17 and bearing 18, thereby ensuring that it is stable and does not move when in use; the third fixing member 16 is not only fixed with the support tabletop 13, but also reserved with international standard ¼" thread, thereby facilitating the function expansion; the core of the rotating portion is the U-shaped clamping slot 14 whose two sides are fixed at the outer side of the fourth fixing member 19 by screws; the flange bearing 12 is built in one end of the clamping slot, and is sleeved with one end of the connecting member 11 and fixed by a nut; the other end of the connecting member 11 is fixed with the telescopic rod 10, and the other end of the telescopic rod 10 is fixed with the first fixing member 4; and the pan-tilt 3 is fixed with the first fixing member 4 through a screw, thereby flexible camera mounting options are provided. It can be used directly with a camera or by being equipped with the L-shaped holder 1 to match mobile phone photographic, increasing the interchangeability and versatility of the platform. The hand-grabbing rod portion is mounted at the lower end of the first fixing member 4 by means of the second fixing member 6, and one roller 9 is respectively mounted on each hand-grabbing rod 8, so that the mobility of the platform is improved; the plastic gasket 7 and the butting screw 5 between the hand-grabbing rod 8 and the second fixing member 6 ensure the stability and adjustment flexibility of the hand-grabbing rod. The design of this panorama photographic platform has taken into account portability, stability and multi-functionality, and can be applied to various photographic environments and needs, thereby providing a highly adjustable and flexible photographic platform for photographers.

Finally, it should be noted that the above content is only used to illustrate the technical solution of the present disclosure, and not to limit the scope of protection of the present disclosure, and the simple modification or equivalent replacement of the technical solution of the present disclosure by a person skilled in the art does not deviate from the essence and scope of the technical solution of the present disclosure.

What is claimed is:

1. A tabletop panorama photographic platform, comprising an L-shaped holder (1), an equipment clamp (2), a pan-tilt (3), a first fixing member (4), a butting screw (5), a second fixing member (6) and a plastic gasket (7), wherein the equipment clamp (2) is movably connected to a back end of the L-shaped holder (1), the pan-tilt (3) is movably connected to a lower end of the L-shaped holder (1), the first fixing member (4) is fixedly connected to a lower end of the pan-tilt (3), the butting screw (5) is fixedly connected to a lower end of the first fixing member (4), the second fixing member (6) is fixedly connected to a lower end of the butting screw (5), and the plastic gasket (7) is fixedly connected to a lower end of the second fixing member (6), wherein hand-grabbing rods (8) are movably connected to left and right ends of the first fixing member (4), and a roller (9) is movably connected to a lower end of each of the hand-grabbing rod (8), one end of a telescopic rod (10) is movably connected to the first fixing member (4), and a connecting member (11) is fixedly connected to the other end of the telescopic rod (10), and a U-shaped clamping slot (13) is fixedly connected to a rear side of the telescopic rod (10), a flange bearing (12) is fixedly connected to a front end of the U-shaped clamping slot (13), and the connecting member (11) is fixed with penetrating through the U-shaped clamping slot (13) and the flange bearing (12).

2. The tabletop panorama photographic platform of claim 1, wherein a fourth fixing member (19) is fixedly connected inside the U-shaped clamping slot (13), and a rotating bearing (18) is movably connected both upper and lower ends of the fourth fixing member (19).

3. The tabletop panorama photographic platform of claim 2, wherein a knurled nut (17) is movably connected to a upper side of the rotating bearing (18), and a third fixing member (16) is fixedly connected to a upper end of the knurled nut (17).

4. The tabletop panorama photographic platform of claim 3, wherein a supporting table (14) is fixedly connected to a upper end of the third fixing member (16) by a table fixing screw (15).

5. The tabletop panorama photographic platform of claim 4, wherein a supporting rod (20) is fixedly mounted by penetrating into the fourth fixing member (19) and a built-in bearing of the fourth fixing member (19), and a base (21) is fixedly connected to a lower end of the supporting rod (20).

6. The tabletop panorama photographic platform of claim 5, wherein the base (21) is a vacuum suction cup.

7. The tabletop panorama photographic platform of claim 1, wherein the pan-tilt (3) includes two or more pan-tilt arms, each of the pan-tilt arm connected end by end, one free end of the pan-tilt (3) is connected with the L-shaped holder (1).

* * * * *